United States Patent
Harrison

[15] 3,661,235
[45] May 9, 1972

[54] BRAKE DISC AND HUB COMBINATION

[72] Inventor: Anthony William Harrison, Birmingham, England

[73] Assignee: Girling Limited, Birmingham, England

[22] Filed: Mar. 17, 1970

[21] Appl. No.: 20,359

[30] Foreign Application Priority Data

Mar. 22, 1969 Great Britain......................15,173/69
July 4, 1969 Great Britain......................33,747/69

[52] U.S. Cl.......................188/218 XL, 29/513, 192/107 R
[51] Int. Cl...........................................................F16d 65/12
[58] Field of Search..............188/71.6, 73.2, 218 XL, 264 A,
188/264 AA; 192/107 R, 113 A; 29/512, 513, 523,
159 R, 159.3, 470.5

[56] References Cited

UNITED STATES PATENTS 2,013,805   9/1935   McIntosh..............................29/512 X
2,233,594   3/1941   Eksergian.........................188/264 A X
2,656,730   10/1953  Mitchell..................................29/512 X
2,926,760   3/1960   Lucien....................................29/513 X
3,542,166   11/1970  Harrison............................188/218 XL Primary Examiner—George E. A. Halvosa
Attorney—Scrivener, Parker, Scrivener and Clarke

[57] ABSTRACT

A brake disc for use in a disc brake and a method of manufacture thereof is characterized in that the bell and annulus are separately manufactured with complementary abutting datum surfaces and are engaged together by projections on one which mesh in slots to hold the two members together against relative axial and rotational movement. Preferably the projections engage the sides of the slots and not the roots so that there is some rotational preloading. The projections can be provided on a continuous or discontinuous skirt integral or welded to the bell and the slots are on a surface of the annulus opposite to the datum face thereof. The projections may be partially sheared from a continuous skirt.

9 Claims, 11 Drawing Figures

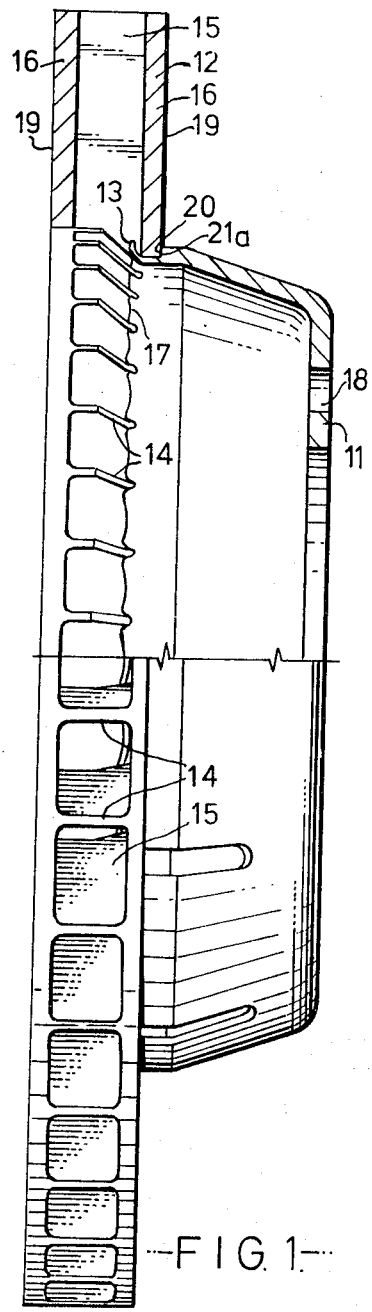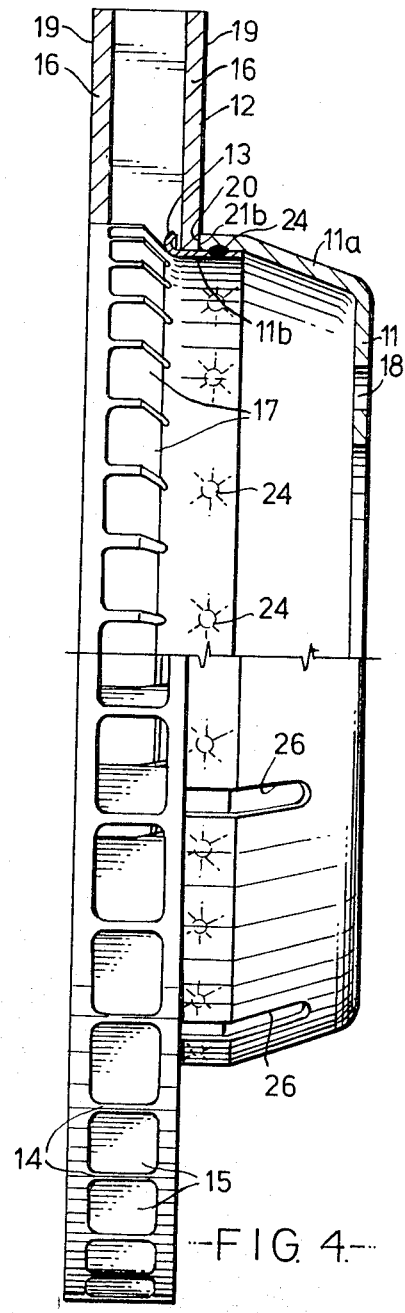

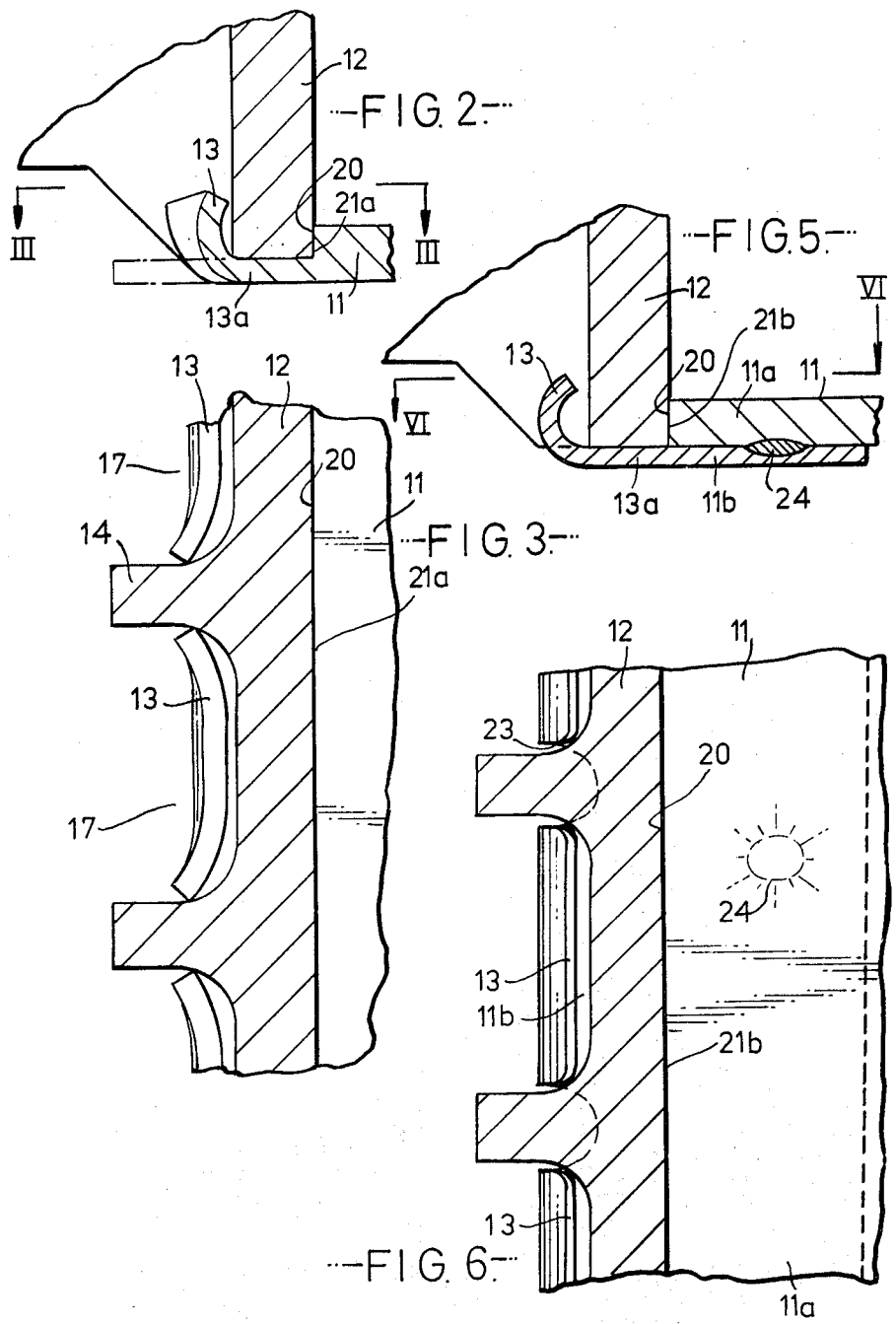

BRAKE DISC AND HUB COMBINATION

INTRODUCTION

The present invention concerns a brake disc, that is, the rotating part of a disc brake which is to be contacted with opposed friction pads by suitable means to arrest say, a vehicle.

As is well known, a brake disc comprises a hub part, sometimes called the bell, and an annulus provided with the braking surfaces. In this specification bell and annulus are used to mean these parts.

Problems are encountered with thermally induced distortion and thermally induced cracking of brake discs. To overcome these problems, expensive constructions of brake discs have been devised.

The object of the present invention is to minimize the cost and complexity of brake disc construction.

The present invention in one aspect provides a brake disc comprising a bell member and a separate annulus member which abut each other on a datum face and are held thereagainst by a skirt on one member, circumferentially spaced projections from this skirt meshing in slots in the other member to hold the two members irrotationally.

According to another aspect of the present invention, there is provided a method of making a brake disc for a disc brake comprising placing a bell member and an annulus member in abutting relationship and deforming a skirt on one of said members around the other member to hold the members together and into slots in the other member to hold the members relatively irrotational.

This construction can be used with a braking annulus of either the solid or ventilated type.

Embodiments of the present invention, will now be described, by way of example, with reference to the accompanying drawings.

IN THE DRAWING

FIG. 1 is a side view half in section of a first embodiment of the brake disc,

FIG. 2 is a sectional detail of the embodiment shown in FIG. 1,

Figure 7:
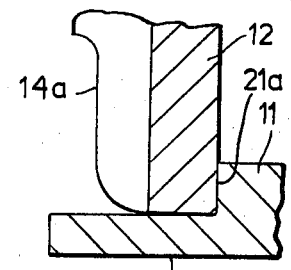
Figures 8, 9:
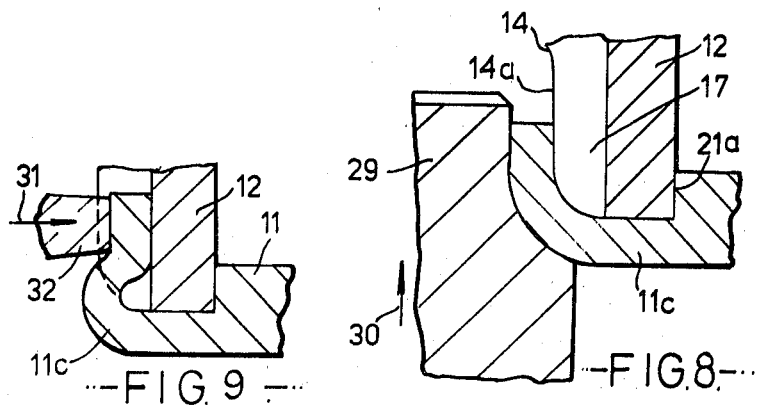
Figure 10:
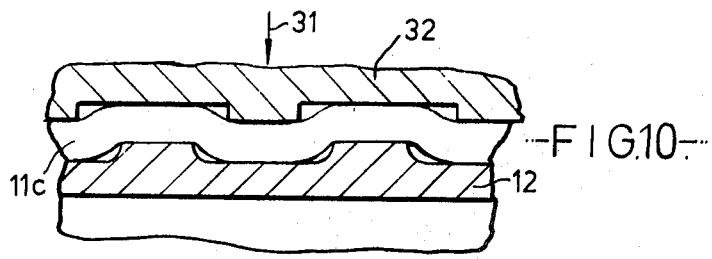
Figure 11:
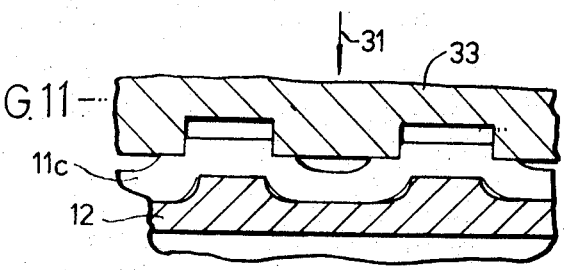

FIG. 3 is a further detail of the embodiment of FIG. 1 taken at right angles to the detail of FIG. 2 along line III—III, FIG. 4 is a side view half in section of a second embodiment, FIG. 5 is an enlarged detail of part of FIG. 4, FIG. 6 is an enlarged detail of a cross-section of FIG. 5 along line VI—VI of FIG. 5, FIG. 7 is a detail axial section of the connection between a bell and an annulus in a first stage of manufacture of a third embodiment, FIG. 8 is a similar detail in a second stage of manufacture showing a forming tool, FIG. 9 is a third stage of manufacture showing another tool, FIG. 10 is a developed view on the line of arrow 31 in FIG. 10, and FIG. 11 is a developed view on the line of arrow 31 in FIG. 10 but showing a final press tool operation.

The specific embodiments have a bell or hub portion 11 and an annulus 12 which are interengaged by projections 13 from the bell which engage in slots 17 in the annulus. The annulus has vanes 14 to create a flow of air through a hollow interior 15 of the annulus to cool the annulus. The annulus is cast. It will be appreciated that the annulus illustrated consists of the bare essentials namely, side walls 16 and cooling vanes 14. The slots 17 are defined between the vanes 14 but with uncooled brake discs or if desired for other reasons the slots 17 can be machined in the annulus. The bell can be a simple pressing and has four holes 18 by which it is to be attached to a shaft or wheel which is to be braked.

It is of course obvious that the annulus has got to be machined to provide braking surfaces 19 and also a datum face 20. Similarly, the pressed bell has also to be machined to provide a datum or true running face. In FIG. 2 the bell datum face is a shoulder 21a machined onto the bell but in FIG. 5 it is a machined end 21b of the bell. The slots are in a face of the annulus that faces in the opposite direction to the datum face on the annulus.

In FIG. 2 the projections 13 are formed in a skirt 13a integral with the bell and are in the form of castellations extending axially from the bell initially and defined by notches or like discontinuities but subsequently deformed into the slots 17 between the vanes 14. The projections are initially wider than the slots so that the projections when urged into the slots deform partially elastically into the arcuate shape shown in FIG. 3 and provide a resilient loading of the annulus against the bell. Moreover since the forces on the annulus exerted by the projections have components in a circumferential direction, there is a measure of circumferential pre-loading which ensures that there is no tendency for the annulus to move angularly relative to the bell.

In the embodiments of FIGS. 4 to 6 instead of the bell being a simple pressing, the bell comprises a simply pressed part 11a and a strip 11b of material. The strip has notches 23 punched out along one of its edges so as to leave the castellations or projections 13 between these notches and the strip is preformed so as to have the projections curved up. After fitting the bell part 11a to the annulus, this strip is sprung or otherwise located as shown and is clamped hard against the annulus so that the projections tend to straighten while the strip is electrically spot welded 24, or otherwise joined to the part 11a to form the skirt of the composite bell. Afterwards the projections will try to regain the curvature and will exert a resilient pre-loading. In these figures the strip is made so that the projections are narrower than the widths of the slots in which they fit but because of the curved roots entailed by casting the effect is virtually the same as in FIGS. 1 to 3. If the roots were sharper, the projections would have to be broader than the slots, so that the projections would engage on the vanes themselves.

The strip 11b need not be continuous but could be a plurality of arcuate lengths of strip. Particularly with machined slots where the roots of the slots may be sharp edged, the slots can have tapered sides to give a radial and a circumferential reaction force between the sides of the slot and the projections where the projections contact the sides, that is at the corners of the projections.

Radial expansion of the annulus due to braking heat can be allowed for by relative sliding movement of the projections in the slots or by means of slits 26 in the bell which provide a degree of radial resiliency as described in our U.S. Pat. No. 1,133,110.

In a third embodiment, the manufacture of which is illustrated in FIGS. 7 to 11, slots 17 are defined on the annulus 12 by cooling vanes 14 which are provided with portions 14a wherein the vanes extend a constant distance from the plane of the annulus that is to say these portions of the vanes form ridges of uniform height extending from the annulus.

The bell 11 is formed with a continuous skirt 11c which initially extends axially into the annulus from a datum surface 21a machined on the bell. This skirt can be homogeneous with the bell or can be a strip or arcuate lengths of strip welded or otherwise joined onto the bell as in the earlier embodiment.

The skirt is then flanged to lie over the slots by means of a suitable press or spinning tool 29 (FIG. 8) which urges the material radially outwardly in the direction of arrow 30 and then forced along arrow 31 into the slots between the vane portions 14a by a tool 32 in a projection forming second operation (FIG. 9) which stretches the skirt locally and into the slots by a tool 33 in a final pressing operation (FIG. 11), which at least partially shears the projections from the lands left between them along at least part of the slot edges as illustrated. It will be found that the projections tend to spring back clear of the slots into an arcuate section in a plane transverse to the slot and contact only the sides thereof. Because of the stretching that occurred in the second operation, the effect is the same as in the preceding embodiments namely that the projection is oversize for the slot and a force fit ensues to give a resilient pre-loading.

It will be apparent that the various forms illustrated in FIGS. 1 and 4 can be modified in accordance with the procedure outlined with reference to FIGS. 7 to 11.

Moreover it will be apparent that the slots need not be on a face transverse to the axis of the annulus but could be on a peripheral surface. For example, the bell could be clinched onto the annulus in one operation with the skirt hard against an axially transverse surface and then the material of the skirt deformed into slots defining axial splines or similar teeth on the interior or exterior of the annulus.

The present invention can be adapted to provide many advantages amongst which are:
a. the possibility of standardizing on a small range of annuli for combination with any number of hubs or bells for differing vehicles,
b. the straight forward manner of machining the annulus bearing in mind that deformation of projections caters for and offsets wide manufacturing errors,
c. the ease of manufacturing of the bell,
d. the manner of assembly is simple and permanent requiring only a press operation or welding and
e. that the annulus runs true since it is located on two flat datum surfaces.

I claim:

1. A brake disc for use in a disc brake comprising a bell and an annulus held together in a precise relationship, with a datum face on an axial face of the annulus pressed against a complementary datum face on the bell by a skirt extending from the bell, which skirt extends around a peripheral face of the bell into abutment with a second axial face of the annulus facing in the opposite direction to the first-mentioned axial face, there being slots in the annulus and projections from said skirt which engage in the annulus slots, characterized in that said skirt is clenched around the inner peripheral face of the annulus whereby on radial thermal expansion of the annulus, the annulus can slide outwardly relative to the bell rather than pushing the ball apart.

2. A brake disc according to claim 1 wherein the annulus is of the type having cooling vanes to ventilate the disc and wherein said slots are defined between the cooling vanes.

3. A brake disc according to claim 1 wherein the bell member is made as a single integral pressing and the projections are an integral part of the bell member.

4. A brake disc according to claim 1 wherein the slots are provided on an axially transverse surface.

5. A brake disc according to claim 4 wherein the slots are in said second axial face.

6. A brake disc according to claim 1 wherein the projections contact the sides of the slots and are held deformed thereby so that the projections press resiliently on the sides of the slots to give a resilient pre-loading.

7. A brake disc according to claim 6 wherein the projections are held curved transversely to the slots by the sides thereof.

8. A brake disc according to claim 1 wherein the skirt is substantially continuous.

9. A brake disc according to claim 8 wherein lands left between the projections hold the datum surfaces firmly in contact with each other.

* * * * *